US009159238B2

(12) United States Patent
Manolescu

(10) Patent No.: US 9,159,238 B2
(45) Date of Patent: Oct. 13, 2015

(54) LOCATION-AWARE SELECTION OF PUBLIC TRANSPORTATION

(75) Inventor: Dragos A. Manolescu, Kirkland, WA (US)

(73) Assignee: Microsoft Technology Licensing, LLP, Redmond, WA (US)

( * ) Notice: Subject to any disclaimer, the term of this patent is extended or adjusted under 35 U.S.C. 154(b) by 840 days.

(21) Appl. No.: 12/244,656

(22) Filed: Oct. 2, 2008

(65) Prior Publication Data

US 2010/0088026 A1   Apr. 8, 2010

(51) Int. Cl.
*G01C 21/00* (2006.01)
*G08G 1/00* (2006.01)

(52) U.S. Cl.
CPC ....................................... *G08G 1/20* (2013.01)

(58) Field of Classification Search
CPC ............ G08G 1/123; G08G 1/096838; G08G 1/096883; G08G 1/0969; G08G 1/127; G08G 1/092; G08G 1/0962; G08G 1/096811; G08G 1/096816; H04W 4/02; H04W 64/00; H04W 28/06; H04W 4/028; H04W 64/006; H04W 8/18; H04W 28/04; H04W 36/14; H04W 48/16
USPC ......... 701/300, 117, 200, 209, 428, 438, 446, 701/457, 517; 340/994, 998, 990, 539.11, 340/539.18
See application file for complete search history.

(56) References Cited

U.S. PATENT DOCUMENTS

| | | | |
|---|---|---|---|
| 5,799,263 A * | 8/1998 | Culbertson .................... | 701/117 |
| 5,948,040 A * | 9/1999 | DeLorme et al. ............. | 701/426 |
| 6,006,159 A * | 12/1999 | Schmier et al. ............... | 701/200 |
| 6,184,802 B1 * | 2/2001 | Lamb ............................ | 340/994 |
| 6,208,934 B1 | 3/2001 | Bechtolsheim et al. | |
| 6,421,606 B1 * | 7/2002 | Asai et al. ..................... | 701/209 |
| 7,209,757 B2 * | 4/2007 | Naghian et al. ............ | 455/456.3 |

(Continued)

FOREIGN PATENT DOCUMENTS

JP         07055484 A   *   3/1995   ............. G01C 21/00

OTHER PUBLICATIONS

JP07055484—Navigation Apparatus—Machine Translation, Mar. 1995.*
Steiniger, et al. "Foundations of Location Based Services", Retrieved at <<http://www.geo.unizh.ch/publications/cartouche/lbs_lecturenotes_steinigeretal2006.pdf>>, pp. 1-28, Year: 2006.
Chang, et al., "Location-Aware Mobile Transportation Information Service", Retrieved at <<http://ieeexplore.ieee.org/iel5/10837/34155/01628036.pdf?tp=&isnumber=34155&arnumber=1628036>>, pp. 5, Year: 2005.

(Continued)

*Primary Examiner* — John R Olszewski
*Assistant Examiner* — Truc M Do
(74) *Attorney, Agent, or Firm* — Steven Spellman; Danielle Johnson-Holmes; Micky Minhas

(57) ABSTRACT

A mobile device such as a mobile phone, smart phone, personal music player, handheld game device and the like that is configured to be location-aware through GPS (Global Positioning System), cell tower positioning, or other means of determining location, is provided with a public transportation selector functionality that interfaces with one or more on-line public transportation schedule services. The public transportation selector passes the location of a user of the mobile device, the user's destination, and the targeted arrival time to the schedule services which responsively return information including, for example, station/stop location information, route identifier, departure and arrival times, and fare costs. The public transportation selector aggregates schedule information provided by the services for presentation to the user through a user interface on the mobile device. The user can then select the desired public transportation option and be provided with directions to the appropriate station or stop.

15 Claims, 5 Drawing Sheets

(56) References Cited

U.S. PATENT DOCUMENTS

| | | | |
|---|---|---|---|
| 7,336,942 B2* | 2/2008 | Wang | 455/404.2 |
| 7,519,470 B2* | 4/2009 | Brasche et al. | 701/207 |
| 7,928,864 B2* | 4/2011 | Park | 340/994 |
| 2007/0197229 A1* | 8/2007 | Kalliola et al. | 455/456.1 |
| 2007/0225903 A1* | 9/2007 | Liebling | 701/202 |
| 2008/0012733 A1 | 1/2008 | Bermudez | |
| 2008/0027772 A1* | 1/2008 | Gernega et al. | 705/7 |
| 2008/0068221 A1* | 3/2008 | Park | 340/994 |
| 2009/0055089 A1* | 2/2009 | Lee et al. | 701/202 |
| 2009/0119001 A1* | 5/2009 | Moussaeiff et al. | 701/200 |
| 2009/0125218 A1* | 5/2009 | Lee et al. | 701/117 |
| 2009/0239552 A1* | 9/2009 | Churchill et al. | 455/456.3 |

OTHER PUBLICATIONS

Turunen, et al., "Mobile Speech-Based and Multimodal Public Transport Information Services", Retrieved at <<http://www.cs.uta.fi/hci/spi/reports/PUMS-SiMPE.pdf>>, pp. 8, Year: 2006.

Silva, et al., "A Mobile User Location-Based Bus Service Application", Retrieved at <<http://www.scs.org/getDoc.cfm?id=1709>>, Business and Industry Symposium, pp. 56-61, Year: 2004.

Rainio, Antti, "Location-Based Services and Personal Navigation in Mobile Information Society", Retrieved at <<http://www.fig.net/pub/proceedings/korea/full-papers/pdf/plenary1/rainio.pdf, pp. 1-14, Year: 2001.

* cited by examiner

LOCATION-AWARE SELECTION OF PUBLIC TRANSPORTATION

BACKGROUND

People often rely on public transportation in many parts of the world as a safe, efficient, and cost effective way to travel in increasingly crowded urban and suburban areas. But it can often be difficult to quickly identify the available means of public transportation, particularly, for example, in unfamiliar geographic areas, or at times of the day that are not typical or usual for the traveler. Even if the traveler can find a bus or subway station, it is not always straightforward to determine which route to take that will ensure that the traveler will arrive at the desired destination at the desired time.

SUMMARY

A mobile device such as a mobile phone, smart phone, personal music player, handheld game device, and the like, that is configured to be location-aware through GPS (Global Positioning System), cell tower positioning, or other means of determining location, is provided with a public transportation selector functionality (e.g., implemented using a software application) that interfaces with one or more on-line public transportation schedule services. The public transportation selector passes the location of a user of the mobile device, the user's destination, and the targeted arrival time to the schedule services which responsively return information including, for example, station/stop location information, route identifier (e.g., bus number, subway line, etc.), departure and arrival times, and fare costs relating to the available transportation options which may include bus, train, subway, ferry, and other forms of public transportation. The public transportation selector aggregates schedule information provided by the services for presentation to the user through a user interface ("UI") on the mobile device. The user can then select the desired public transportation option and be provided with directions to the appropriate station or stop.

In various illustrative examples, the user inputs a desired destination through the UI. Alternatively, the destination may be identified automatically through an interface with the user's scheduling tool (e.g., appointment book or calendar application) on the mobile device. Actual transit times may be collected and stored in a route database so that the public transportation selector may optimize the transportation options presented to the user. Published route information from the public transportation schedule services, stored user preferences, appointment and contact data, and/or user profile information may also be utilized when performing the optimization. In addition, the public transportation selector may utilize such information when generating suggested points of interest that the user may wish to visit on the way to the station or along the route from the station to the destination. The public transportation selector may also be configured with a functionality to enable the user to pay for the public transportation fare or make a reservation right from the mobile device.

Advantageously, the present location-aware selection of public transportation provides users with an easy to use way to find public transportation that meets their needs. The interfaces between the public transportation selector and other functionalities on the mobile device, such as scheduling applications and user preferences/profile data stores, further enable effective route selection and optimization options to be automatically and transparently generated for the user. The user can thus effectively utilize public transportation in a way that suits their particular needs and preferences.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
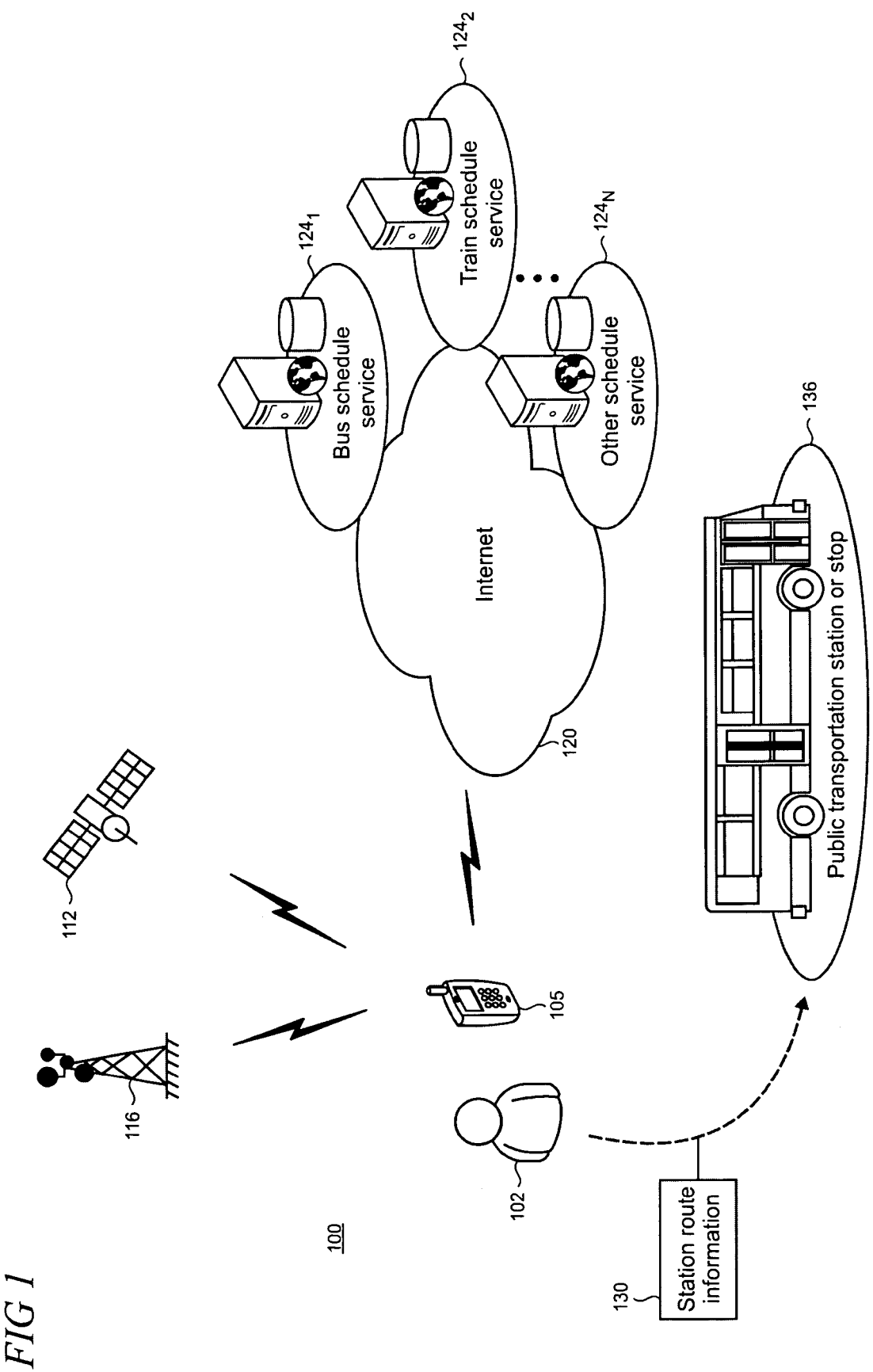
FIG. 1 shows an illustrative public transportation environment in which the present location-aware selection of public transportation may be practiced.

FIG. 1 shows an illustrative public transportation environment 100 in which the present location-aware selection of public transportation may be practiced. In the environment 100, a user 102 employs a location-aware mobile device 105 such as a mobile phone, smart phone, PDA (personal data assistant), handheld game device, handheld computer, pocket PC (personal computer), portable media player such as those which can play MP3 (Moving Pictures Expert Group, MPEG-1, audio layer 3) files, or device which integrates several of such functions. It is noted that these types of mobile devices are intended to be illustrative and that other types of mobile devices may also be used in the present arrangement as may be required to meet the needs of a particular implementation.

The mobile device 105 may be configured with location-awareness using a variety of conventional techniques. These may include, for example, the use of GPS in which location is determined through a triangulation calculation based on signals from a network of satellites (as representatively indicated by reference numeral 112).

Alternatively, cell tower positioning may be utilized to approximate the position of the mobile device 105 by comparing the relative signal strength between the mobile device and multiple antenna towers (as representatively indicated by reference numeral 116). While cell tower positioning is a less accurate technology compared with GPS, it may still provide sufficient accuracy in many cases to provide location-awareness to the mobile device 105 in the present application. In addition, cell tower positioning often provides superior location determination compared with GPS when mobile devices are used indoors. In some implementations, it may be desirable to use both GPS and cell tower positioning technologies. It is emphasized that the foregoing examples of location-awareness are intended to be illustrative only and that other methodologies may also be utilized as may be required to meet the needs of a particular implementation.

The mobile device 105 is further configured for wireless communication using a mobile data network to gain access to resources that are located on a public network such as the Internet 120. The mobile data network could be arranged, for example, in accordance with GPRS (General Packet Radio Service), EVDO (Evolution Data Optimized), UMTS (Universal Mobile Telecommunications System), or other known arrangements. In alternative implementations, the resources may be accessed via private network infrastructure such as VPN (virtual private networks).

The Internet-accessible resources include public transportation schedule services 124 which include, in this illustrative example, a bus schedule service $124_1$, a train schedule service $124_2$, and transportation schedule service $124_N$ named "other" which is intended to represent a service that covers other forms of public transportation. These include, for example (but are not necessarily limited to) trains, light rail conveyances, subway, trams, trolleys, streetcars, ferries, water taxis, and similar types of transportation that may be provided by public or private entities for the benefit of the general public.

The transportation services 124 are configured to support databases of information that pertain to their respective type of transportation. So, for example, the bus schedule service $124_1$ will typically have access to bus routes, schedules, fare, and other information (e.g., general passenger, station, or accessibility information, the availability of special services, etc.) for one or more bus lines or providers that may service a particular geographic region. Such data can be populated into the databases using any of a variety of conventional methods including manual and automated data capture methods using schedule information that is typically published by the transportation provider.

It is noted that while separate schedule services 124 are shown in FIG. 1, in some implementations, the services may be combined or consolidated. For example, a single schedule service 124 might be used to provide information about more than one type of transportation. There is no requirement that schedule services be implemented on a one-to-one basis with the available types of transportation.

The location-aware mobile device 105 can interact with the transportation services 124 to receive schedule, public transportation station or stop locations, route identifiers (e.g., bus number, subway line, ferry dock number, etc.), fare or ticket price, and other information from the services in response to a query or request from the device. The query will typically specify the location of the user, the user's destination, and the desired time of arrival. The mobile device 105 can thus receive, for example, a list of transit options, directions to route the user 102 (as indicated by reference numeral 130) to the station or stop 136 of a train, bus, subway, etc., that is near to the location of the user 102 and identify the appropriate line, number, or route that can take him or her to the destination in the desired timeframe, and fare information.

Figure 2:
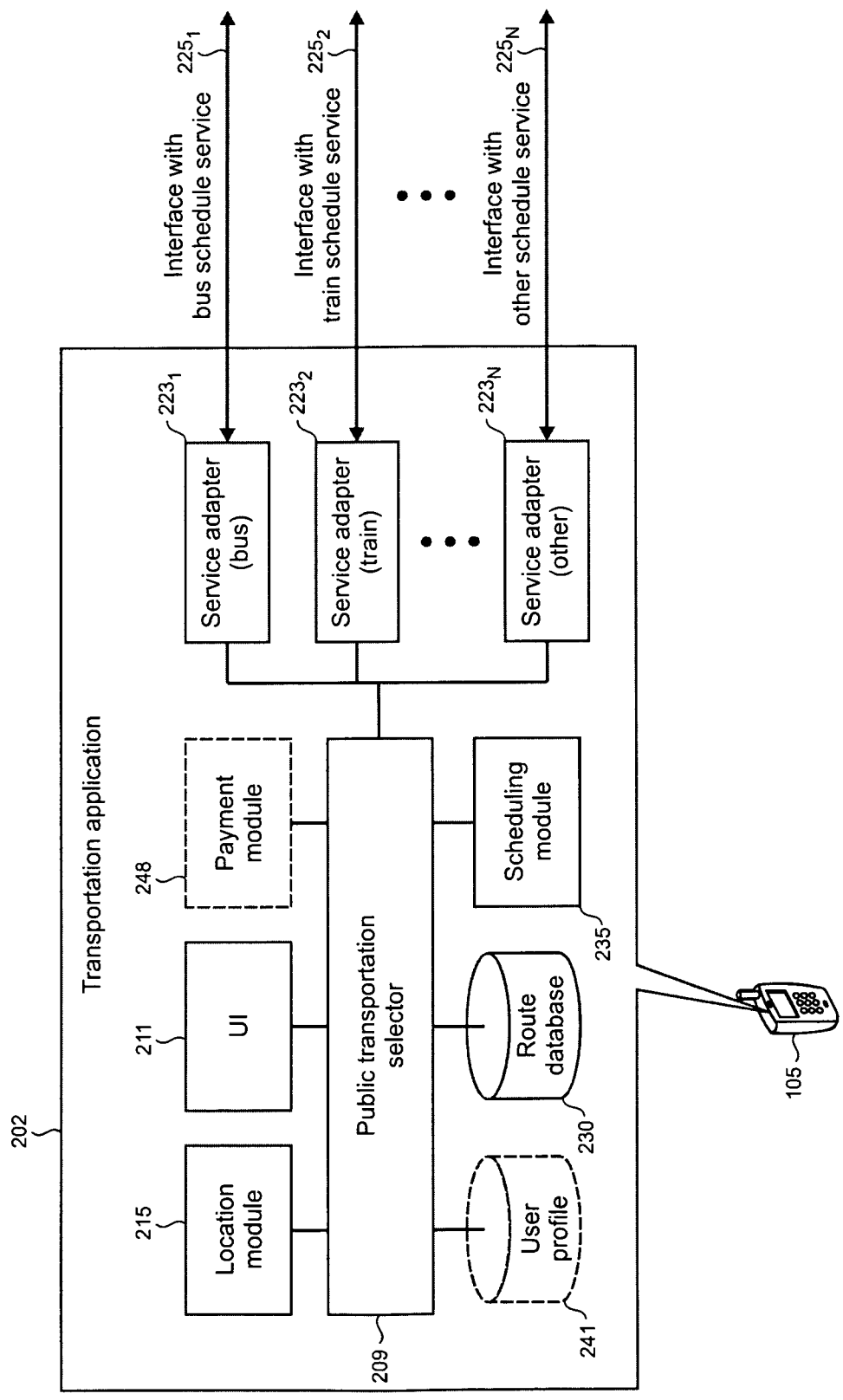
FIG. 2 is a simplified functional block diagram of a transportation application that is configured to run on a mobile device.

More specifically, as shown in FIG. 2, the mobile device 105 includes a transportation application 202 that is configured to interact with one or more of the transportation services 124 to enable the present public transportation selection feature set when run on the device. Typically, the transportation application 202 will run as software code on the mobile device 105, although it can also be implemented using firmware and/or hardware-based solution, or combinations of software, firmware, and hardware in some implementations. In addition, the transportation application 105 can be supported by the mobile device 105 under various "software as services" models where all or a portion of the application runs on a remote server.

In this example, the transportation application is architected, as shown in FIG. 2, using a number of components. However, it is emphasized that the particular components shown in FIG. 2 and described below are intended to be illustrative and that the functionality supported therein may be provided by components or modules other than those shown, or be allocated among the components in a different manner than that described.

The transportation application 202 includes a public transportation selector 209 that is configured to provide the core location-aware selection functionality. The user 102 interacts with the public transportation selector through a UI 211, typically through support of a graphical display and a means for input capture. A location module 215 provides the interface to the location-aware hardware in the mobile device such as GPS or cell tower positioning components.

A group of service adapters 223 provide interfaces 225 over the wireless data network to the respective schedule services 124 on the Internet 120 (FIG. 1). In particular, as shown, a service adapter (bus) $223_1$ provides an interface $225_1$ to the bus schedule service $124_1$. Similarly, the service adapter (train) $223_2$ provides an interface $225_2$ to the train schedule service $124_2$. And, the service adapter (other) $223_N$ provides an interface $225_N$ to the other schedule service $124_N$. The particular number and type of service adapters 223 utilized in any given implementation can vary from that shown in FIG. 2. In addition, service adapters can be created by third parties (i.e., parties other than a mobile device maker, transportation application provider, or schedule service provider) and utilized to enhance the capabilities of the present arrangement in some applications.

A route database 230 is utilized locally on the mobile device 105 to route information that is downloaded from the schedule services as well as to provide a store for actual transit times experienced by the user 102 when following a particular transportation route. Alternatively, the actual transit times can be collected for other users for a variety of routes at some central collection point (such as a data server) and then uploaded to the route database. As described in more detail below, such historical transit times can be utilized by the public transportation selector, alone or in combination with other data, as part of the optimization of transportation options that are presented to the user 102 through the UI 211.

A scheduling module 235 is configured to provide an interface to the user's scheduling or appointment application that may be running on the mobile device 105. For example, the user may be running an instance of Microsoft Outlook® Mobile on the mobile device 105 to manage e-mail, calendars, contacts, and tasks. The scheduling module 235 enables the public transportation selector 209 to obtain information about the user's schedule and appointments. Typically the user will be provided with an opportunity to synchronize such information with the transportation application. Knowledge of the user's schedule and appointments, including for example, the time and location of such appointments, can assist the public transportation selector 209 to transparently (i.e., without requiring an affirmative or explicit action on the part of the user 102) recognize a need for the user to be at a particular place at a particular time. The public transportation selector 209 can then provide an appropriate set of transportation options that are responsive to such need.

In a similar manner as with the scheduling module, a user profile 241 may be optionally utilized (as indicated by its dashed outline) to further enhance the public transportation selector's ability to provide transportation options to the user 102 that suits the user's needs. As above, the user 102 will typically be provided with an opportunity to opt in to the collection of data regarding the user's usage of the mobile device 105.

Various techniques and heuristics can be employed to infer a user preference from collected profile data. In some cases, user preferences may be explicitly solicited by the transportation application, or may be set, modified or updated by the user 102. For example, if the user profile or preference indicates that buses are most preferred by the user, and subways least preferred, the public transportation selector 209 can act appropriately when providing transportation options for a given usage scenario.

Also optionally utilized in the transportation application 202 is the payment module 248. This module can be used in those implementations where infrastructure is in place to facilitate secure payment transactions to the transportation providers (either directly or via third party service) using the mobile device 105. Such transactions can utilize a pre-payment system or be tied to a traditional credit card, for example. Alternatively, the use of other known electronic payment systems such as near field communications ("NFC") may also be facilitated by the payment module 248 using the mobile device 105 as a delivery mechanism. In some implementations, it may be desirable to collect a fee for facilitating the ticket purchase transaction using the mobile device 105. The recipient of the fee may be one of the schedule service providers, or a third party, for example.

Figure 3:
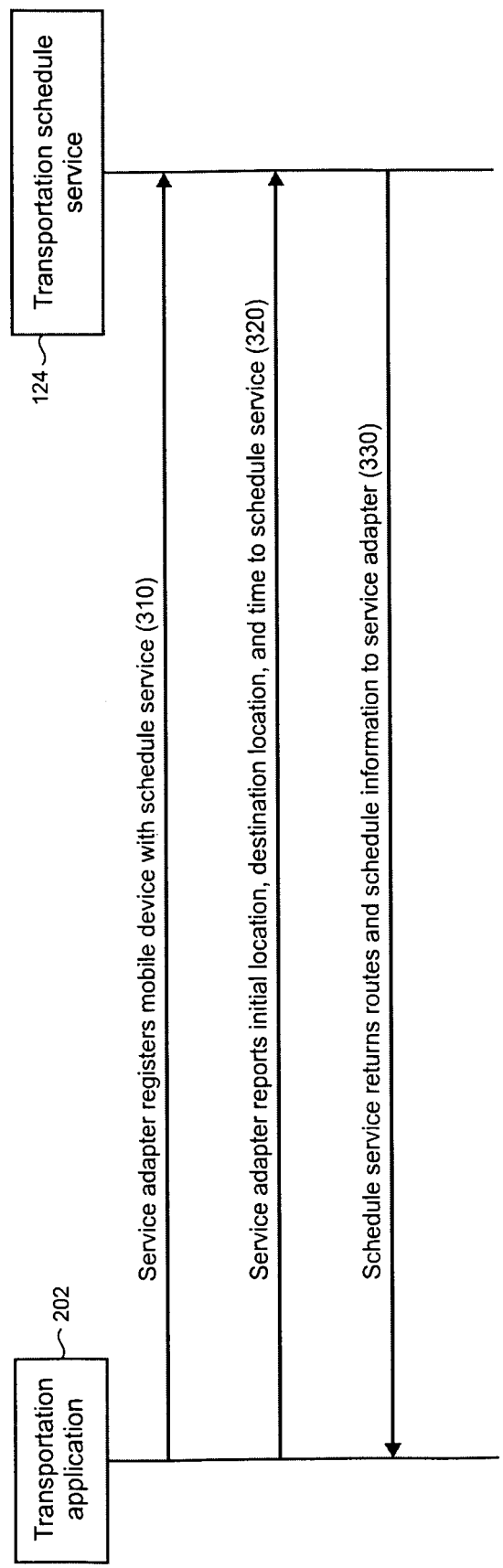
FIG. 3 shows an illustrative communication flow between the transportation application and a transportation schedule service in an example usage scenario.

Turning now to FIG. 3, an illustrative flow of communications between the transportation application 202 and a schedule service 124 is shown for an example usage scenario. The scenario starts by a service adapter 223 in the transportation application 202 registering with its corresponding schedule service 124 (as indicated by reference numeral 310). Thus, for example, the service adapter (bus) $223_1$ will register with the bus schedule service $124_1$ and so forth. The service adapter 223 will typically perform the registration using a simple handshake with the service 124 when there is need to pull schedule data or status updates about service affecting issues. For example, the user 102 may work through the UI 211 to explicitly make a request to locate public transportation. Or, the scheduling module 235 may identify an upcoming appointment at a distant location which the public transportation selector 209 uses as an automatic trigger to initiate the registration in a manner that is transparent to the user.

The location module 215 determines the current location of the mobile device 105 (and hence the location of the user 102) which is relayed via the service adapter 223 along with the destination and desired arrival time to the schedule service 124 (320). In response, the schedule service 124 will return a selection of possible transportation routes with associated schedules for the particular public transportation type and the corresponding fee information back to the service adapter 223 (330).

The route identifies the starting and destination points and, in most cases, schedule information that includes published or approximate departure and arrival times for each route. The number, line, route, or other identifying information will also be provided (e.g., bus #6, the yellow subway line, ferry slip 3, etc.) Typically, as multiple service adapters are used to interface with multiple transportation schedule services, the steps of registration, reporting, and information return are performed with each service adapter and schedule service pair, and the transportation application 202 may assemble a multi-segment route out of segments provided by different types of transportation—for example, a leg of the route by ferry, then by bus, then by subway. Depending upon the particular circumstances, it may be possible for a relatively large amount of information to be passed back from the various transportation schedule services 124 to the transportation application 202 running on the mobile device 105. That is, there may be multiple ways for the user 102 to get to a particular destination using different forms of public transportation that traverse different routes, and within some reasonable interval to the desired arrival time.

Other types of information can also be returned by a schedule service 124. While it may vary by implementation, the information may be drawn from the information databases supported by the schedule service 124 and include general passenger, station, or accessibility information, the availability of special services, etc., as noted above.

Figure 4:
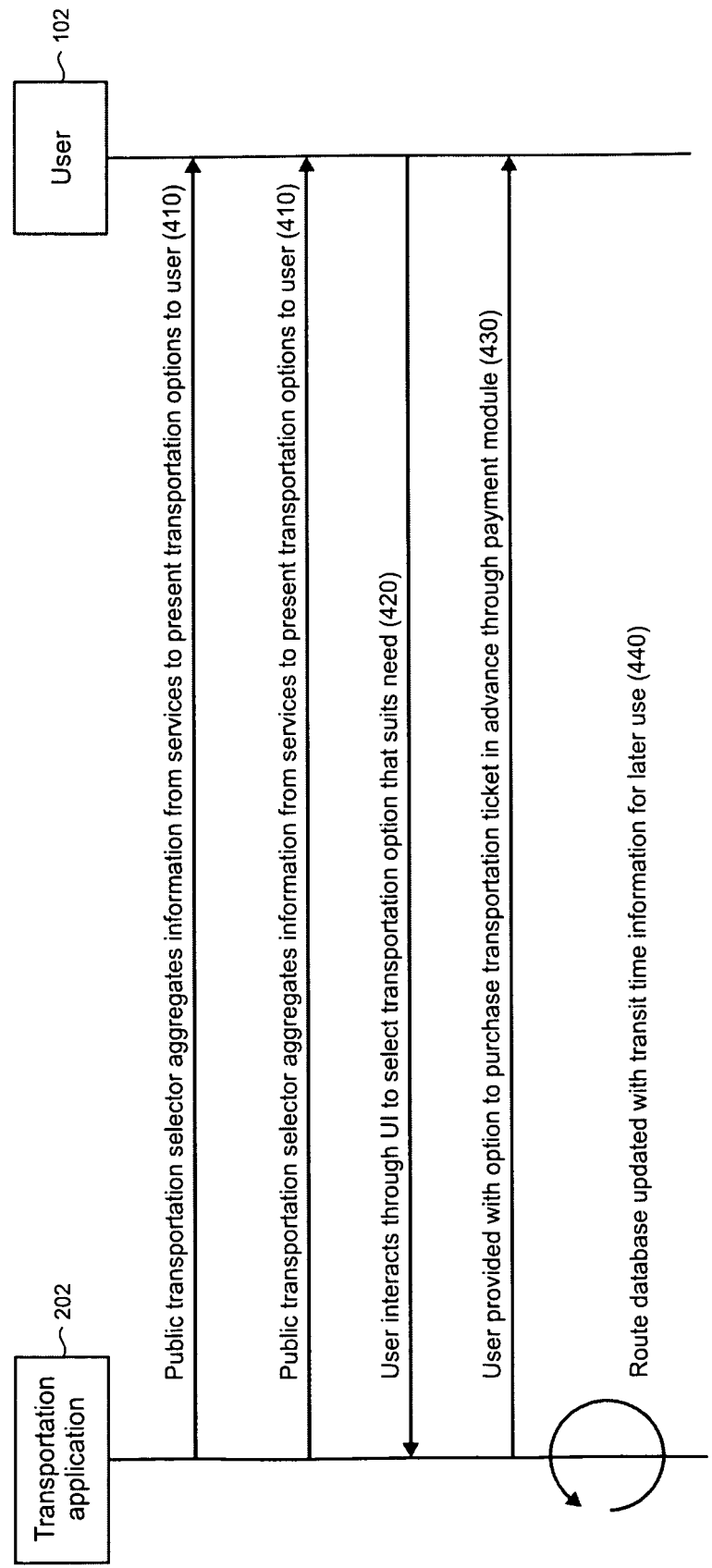
FIG. 4 shows an illustrative communication flow between the transportation application and the mobile device user in an example usage scenario.

The public transportation selector 209 is responsible for taking the route and schedule information returned from the schedule services 124 and presenting it to the user through the UI 211. In some cases, as noted above, the information can aggregate a multi-segment route using different public transportation types. FIG. 4 shows an illustrative flow of communications between the transportation application 202 and the user 102 for the example usage scenario shown in FIG. 3 and described above.

Generally in most implementations it will be desirable for the public transportation selector 209 to apply rules or heuristics to sort or rank order the returned information. In this way the public transportation selector 209 can optimize the routes and schedules to present the user 102 with a select subset of all the available transportation options (as indicated by reference numeral 410). Alternatively, the optimization can be performed remotely by one of the schedule services 124 or by another remote service. Optimization may also be shared between the locally running transportation application and a remote service.

The optimization techniques may vary by implementation. In some cases, the public transportation selector 209 will consider locally stored information such as historic transit times from the route database 230, or profile and/or user preferences from the user profile 241.

With the route database 230, the stored historical transit times for a particular route (or any other information provided by the user) enable the public transportation selector 209 to determine the likelihood of a transportation option getting the user 102 to the destination by the desired time. Thus, for example, while published schedule information may indicate that a bus running on a city's west side route is supposed to arrive at the central station at 2 pm, the historical data may show that this bus typically runs late.

The historical transit time information may also be particularly useful for public transportation that does not provide published departure and arrival times. With some subway lines, for example, subway cars arrive at each station on a periodic basis but not at a set time. In this case, the historical transit time information will typically help the public transportation selector 209 in determining whether that particular subway route is an appropriate option to present to the user 102 and further enable the public transportation selector to provide approximate departure and/or arrival times.

The public transportation selector 209 may use data from the user profile 241 to optimize route selection by filtering or weighting transportation options based on explicitly generated user preferences or preferences that may be inferred from the collected user profile data. Thus, transportation by subway may be considered a more optimized solution for the user 102 in light of the profile or preference, even if a bus stop, for example, may be physically closer to the user's current location at the time of the query. Accordingly, the public transportation selector 209 will typically rank order subway routes over bus routes when presenting transportation options to the user 102 when it is determined that subways are the user's preferred type of transportation.

When presented with the transportation options, the user 102 can work through the UI to pick an option that is desired and meets the user's needs (420). Responsively to the user's selection of the transportation option, station route information (i.e., direction) will be provided through the UI 211 (430). The user 102 may also be optionally presented with the ability to make an electronic payment for the fare associated with the selected transportation option, or make a reservation (440). In this case, the functionality from the payment module 248 will typically be invoked.

As the user 102 makes the trip using the selected transportation option, the actual transit time associated with the route will be collected so that the route database 230 can be updated. The transit time can be calculated once the location module 215 indicates that the mobile device 105 (and hence the user 102 as well) has arrived at the destination.

Figure 5:
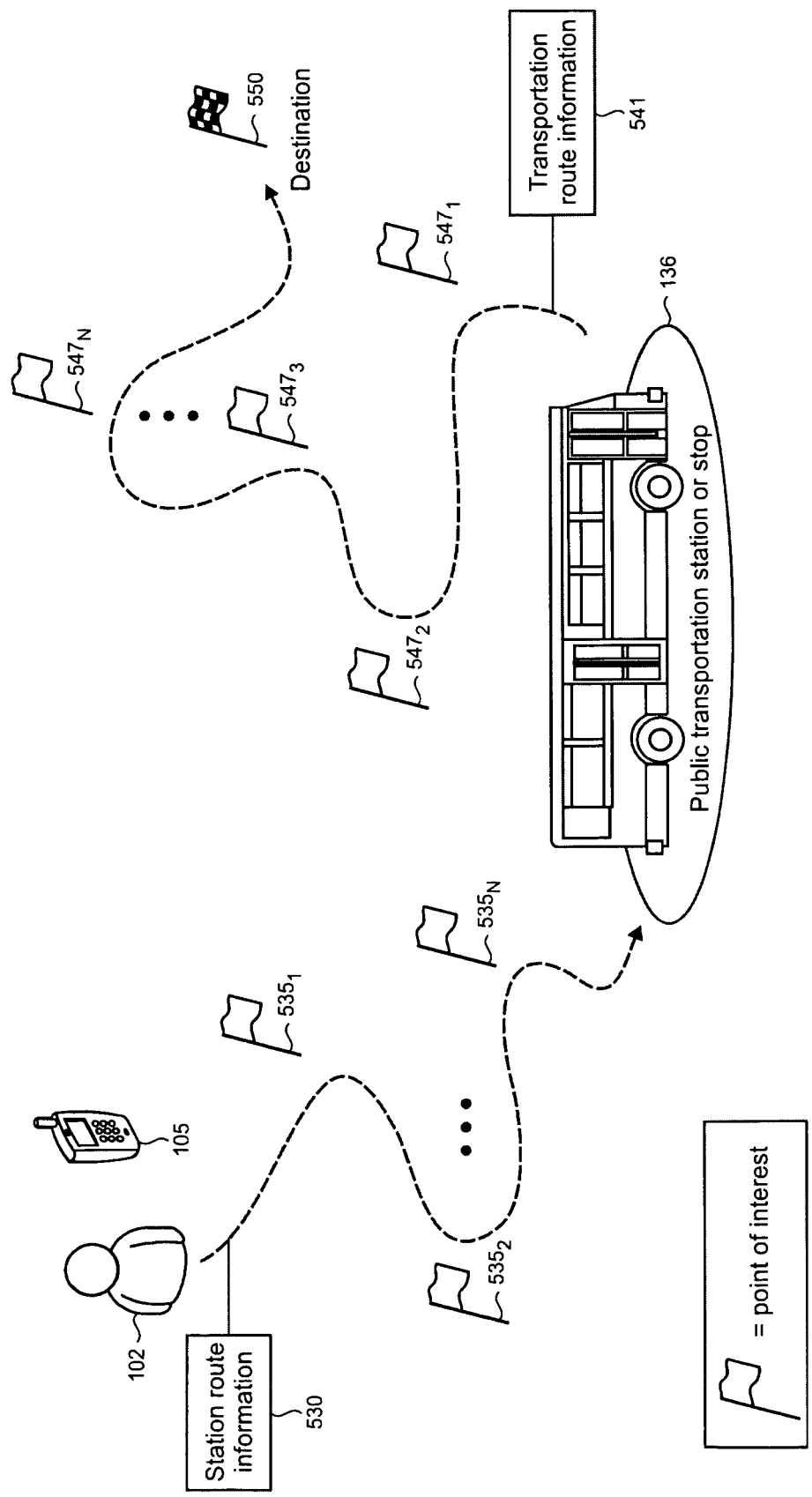
FIG. 5 shows an illustrative public transportation route that is annotated with points of interest.

Additional value-added features may also be advantageously implemented using the present location-aware public transportation selection arrangement. As shown in FIG. 5, the public transportation selector 209 can annotate the station route information 530 (i.e., the directions to the station or stop 136) with various points of interest $535_{1, 2 \ldots N}$ along the route. The points of interest 535 may vary by implementation and may include, for example, friends of the user 102, retail stores, museums, restaurants, and the like. The points of interest 535 can be automatically generated by the public transportation selector 209 using locally available data. Alternatively, the points of interest 535 can be generated remotely using an external service.

So, for example, the public transportation selector 209 might determine from the user's contact list that is available from the scheduling module 235 that a friend or acquaintance of the user 102 resides or works near the route to the station 136. If so, the UI 211 can include an annotation with the station route information 530 that there is an opportunity for a visit with the friend or acquaintance.

If the current time is close to a meal time, the public transportation selector 209 may also include an annotation with the station route information 530 that a restaurant that the user 102 may like is along the route to the station 136. The public transportation selector 209 may use data from the user profile 241 when making this annotation.

If the scheduling module 235 indicates that the user 102 has created a task to purchase a gift, for example, for a friend's upcoming birthday, the public transportation selector 209 can make an annotation that an appropriate retail store is along the route to the station 136.

Data from the user profile 241 or scheduling module 235 may be used in a similar manner as in the examples above to generate annotations about other points of interest for the user 102 (e.g., museums, memorials, historical sites, recreation and entertainment, and the like). Should the user 102 wish to take time to accommodate a point of interest, the public transportation selector 209 can re-query the schedule services 124, if necessary and then determine additional transportation options that may be presented to the user 102 that take into account the additional time.

The constellation of potential points of interest 535 can be stored locally in the mobile device 105 and be periodically updated through interaction with a remote service, for example, so that the annotations reflect current and valid information. Alternatively, the points of interest 535 can be dynamically received in real time by an appropriate query to the remote service.

The public transportation selector 209 can also be configured to generate annotations that are applicable to the route taken by the selected mode of public transportation. As shown in FIG. 5, the transportation route information 541 may include annotations of various points of interest $547_{1, 2 \ldots N}$ that the user 102 may wish to visit along the transportation route to the destination 550. The public transportation selector 209 can utilize a similar methodology, as described above for annotating station route information, when generating annotations for points of interest 547 to the transportation route information 541. That is, the public transportation selector 209 can take into account locally available information such as data from the scheduling module 235 and user profile 241 when making the annotation for the points of interest 547. And, as with the example above, the public transportation selector 209 can re-query the schedule services 124, if necessary, and determine additional transportation options that may be presented to the user 102 that take into account the additional time required to accommodate a point of interest 547.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable medium not comprising a propagated data signal containing instructions which, when executed by one or more processors on a mobile device associated with a user, implement a transportation application for providing public transportation options to the user, the transportation application comprising:
    a plurality of service adapters, each service adapter configured for interfacing with one of a respective plurality of schedule services and for receiving public transportation information from the one respective schedule service of the respective plurality of schedule services in response to a query transmitted by the service adapter to the one respective schedule service that includes a destination to be reached by the user using public transportation;
    a public transportation selector configured for generating the query, the query being arranged to communicate a present location of the mobile device, a said destination to be reached by the user, and a target time of arrival using the public transportation to the plurality of schedule services; and
    a location module that interfaces with location-aware functionality disposed in the mobile device, the location module identifying the present location of the mobile phone to the public transportation selector.

2. The computer-readable medium of claim 1 in which the transportation application further comprises a route database for storing a transit time associated with travel over a given public transportation route.

3. The computer-readable medium of claim 2 in which the transportation application further comprises a scheduling module for interfacing with scheduling data having applicability to the user, the scheduling data including at least one of appointment, calendar, contact, or task.

4. The computer-readable medium of claim 3 in which the transportation application further comprises a user profile configured for storing profile data that is collected about the user.

5. The computer-readable medium of claim 4 in which at least one of the route database, scheduling module, or user profile is used by the public transportation selector for filtering transportation information from a schedule service.

6. The computer-readable medium of claim 1 in which the location functionality is one of GPS, cell tower positioning, or means for establishing location-awareness.

7. The computer-readable medium of claim 1 in which the transportation application further comprises a payment module configured for facilitating electronic payment for a fare associated with a public transportation route.

8. The computer-readable medium of claim 1 in which the transportation application further comprises a UI for receiving input from the user and for displaying the public transportation options to the user.

9. The computer-readable medium of claim 1 in which the public transportation selector applies one or more heuristics to the information from the plurality of schedule services to thereby optimize the public transportation options presented to the user.

10. A computer-readable medium not comprising a propagated data signal containing instructions which, when executed by one or more processors disposed in a mobile device associated with a user, implement a method on the mobile device for operating a public transportation schedule service for communicating public transportation information to the user associated with the mobile device, the method comprising the steps of:

collecting the public transportation information in a database on the mobile device, the public transportation information being related to one or more types of public transportation that are available for use within a given geographic region;

receiving a query, the query identifying a present location of the mobile device obtained from location-aware functionality disposed in the mobile device, a target destination to be reached by the user using the public transportation, and a target arrival time at the destination;

responsively to the query, extracting a subset of the public transportation information from the database; and presenting the subset of public transportation information to the user via the mobile device, the subset of public transportation information including public transportation options to the destination using the public transportation for arrival at the target arrival time.

11. The computer-readable medium of claim 10, the method including the further steps of transacting a purchase between a public transportation provider and the user associated with the mobile device.

12. The computer-readable medium of claim 10 in which the types of public transportation comprise at least one of bus, rail, light rail, subway, trolley, streetcar, tram, ferry, or water taxi.

13. The computer-readable medium of claim 10, wherein the public transportation information is obtained by the mobile device from a plurality of schedule services via a wireless data network.

14. A mobile device associated with a user and configured to provide transportation information to the user, the mobile device including a transportation application comprising:

location module disposed in the mobile device for determining location information of the mobile device;

a plurality of service adapters and a route database, wherein the plurality of service adapters interface over a network with a respective plurality of schedule services, receive public transportation information from the plurality of schedule services, and store the public transportation information in the route database; and a public transportation selector, wherein the public transportation selector provides location-aware transportation selection functionality according to location information from the location module and the public transportation information in the route database, provided in response to a query entered by a user via a user interface.

15. The mobile device of claim 14 further comprising a payment module facilitate secure payment transactions with one or more transportation providers on behalf of the user.

* * * * *